United States Patent [19]
Bates et al.

[11] Patent Number: 5,732,250
[45] Date of Patent: Mar. 24, 1998

[54] MULTI-FUNCTION MICROPROCESSOR WAIT STATE MECHANISM USING EXTERNAL CONTROL LINE

[75] Inventors: Larry Bates; Elliot Garbus, both of Tempe, Ariz.

[73] Assignee: Intel Corporation, Santa Clara, Calif.

[21] Appl. No.: 786,393

[22] Filed: Jan. 20, 1997

Related U.S. Application Data

[63] Continuation of Ser. No. 306,669, Sep. 15, 1994, abandoned.

[51] Int. Cl.[6] ............................................. G06F 1/12
[52] U.S. Cl. ..................... 395/559; 395/551; 395/560; 395/880
[58] Field of Search ............................ 395/559, 564, 395/551, 552, 560, 880, 878

[56] References Cited

U.S. PATENT DOCUMENTS

| | | | |
|---|---|---|---|
| 4,691,289 | 9/1987 | Thaden et al. | 345/185 |
| 5,239,639 | 8/1993 | Fischer et al. | 395/427 |
| 5,438,614 | 8/1995 | Rozman et al. | 379/93 |
| 5,586,275 | 12/1996 | Ehlig et al. | 395/564 |

*Primary Examiner*—Jack B. Harvey
*Assistant Examiner*—Jeffrey K. Seto
*Attorney, Agent, or Firm*—Blakely, Sokoloff, Taylor & Zafman

[57] ABSTRACT

A wait state mechanism for lengthening a microprocessor's bus cycle to allow data transfers between slower off-chip devices. A microprocessor is responsive to a bus control signal generated by external programmable logic which instructs the microprocessor to insert wait states of varying number depending on the component involved in a bus transaction. The microprocessor receives only a single input from the programmable logic and varies its bus cycle length accordingly.

20 Claims, 12 Drawing Sheets

MULTI-FUNCTION MICROPROCESSOR WAIT STATE MECHANISM USING EXTERNAL CONTROL LINE

This is a continuation of application Ser. No. 08/306,669, filed Sep. 15, 1994, now abandoned.

BACKGROUND OF THE INVENTION

1. Field of the Invention

The present invention relates to the field of computer architecture. More specifically, the present invention relates to a mechanism for interfacing high speed microprocessors with varying speed off-chip components.

2. Art Background

The evolution of semiconductor technology has enabled microprocessors and microcontrollers today to be more powerful than room-sized computers of a few decades ago. As data processing unit chips become faster, data communications with off-chip memory and input/output devices becomes more and more complex.

Modern microprocessors operate at internal speeds (clock rates) that are much faster than the operating speeds of devices with which they communicate. Further, the components in communication with the microprocessor themselves operate at varying speeds. For instance, static random access memory (SRAM) operates much more quickly than dynamic random access memory (DRAM), which in turn operates much more quickly than off-system mass storage devices such as magnetic disc drives.

For each component in communication with the microprocessor in a given computer system or other electronic system, it is necessary for the microprocessor's bus control logic to be equipped for handling the varying speeds of the coupled components. With more and more components added to computer systems, the burden on a microprocessor's bus control logic increases dramatically. The bus control logic must be aware of each type of component to which the microprocessor communicates and insert the appropriate wait states to allow communications with the different speed components to complete. The problem is further increased in a system where the address and data lines of the bus are multiplexed to use the same signal lines. The inserted wait states lengthen the microprocessor's bus cycle to allow data transfers between the slower devices and the microprocessor.

It would be advantageous, and is therefore an object of the present invention, to provide a wait state mechanism for lengthening a microprocessor's bus cycle which is robust and scalable for varying system implementations without increasing the complexity of a microprocessor's bus control logic.

SUMMARY OF THE INVENTION

From the foregoing it can be appreciated that it would be desirable to provide a wait state mechanism that allows a microprocessor to communicate with off-chip components of varying speeds. Accordingly, it is an object of the present invention to provide a method and apparatus for introducing varying wait states into a microprocessor's bus cycle in accordance with the identity of the external component involved in the bus transaction without unnecessarily complicating the bus control logic of the microprocessor.

These and other objects of the present invention are provided by a multi-function microprocessor wait state mechanism which uses a single external control line into the microprocessor for inserting a varying number wait states depending on the nature of the component involved in the bus transaction with the microprocessor. The microprocessor is provided with an external pin for receiving a control signal indicating that a wait state should be inserted for lengthening the microprocessor's bus cycle. The external pin provides the control signal to the bus control logic of the microprocessor.

In one embodiment of the present invention, the control signal for lengthening a microprocessor's bus cycle is generated by a field programmable gate array, or other programmable logic, which monitors bus transactions within the system. The programmable logic recognizes components in the system by decoding their addresses and determines wait state patterns to be provided by the microprocessor in executing bus transactions with those components. The bus control logic within the microprocessor implements logic responsive to the received bus control signal from the programmable logic.

In one exemplary computer system, the microprocessor is in communication with both static random access memory and dynamic random access memory components, a flash memory device, a standard universal asynchronous receiver/transmitter (UART), an LCD module for display, a parallel port and a field programmable gate array (FPGA). The FPGA monitors bus transactions and provides the bus wait state control signal to the microprocessor for inserting the appropriate wait state pattern by the microprocessor for transactions with the various components in the system.

The described wait state mechanism provides for three types of wait states: address-to-data wait states, data-to-data wait states and turnaround or recovery wait states. Address-to-data wait states are applicable to microprocessors in general. Data-to-data wait states are applicable to microprocessors capable of burst bus accesses such as the exemplary computer system described. Finally, recovery wait states are particularly applicable to microprocessors employing multiplexed address/data buses. When a bus is multiplexed, recovery wait states allow memory and input/output devices a greater amount of time to quit driving the bus before the microprocessor drives the next address. Recovery wait states are also useful for fulfilling minimum cycle time requirements for slow input/output devices.

BRIEF DESCRIPTION OF THE DRAWINGS

The objects, features and advantages of the present invention will be apparent from the following detailed description in which.

DETAILED DESCRIPTION OF THE INVENTION

The present invention provides a method and apparatus for lengthening a microprocessor's bus cycle to allow data transfers with slower off-chip devices by inserting wait states as appropriate. In this detailed description, one exemplary embodiment of a computer system architecture is described where varying bus cycle lengths are required for differing speeds of off-chip components. It should be understood that this is for the purpose of illustration and is not provided as a limitation in that the present invention may be practiced within other computer systems where it is desirable to provide a mechanism for interfacing a microprocessor to other components that operate at different speeds.

Throughout this detailed description, numerous specific details are set forth such as particular signal names, bus protocols and wait state intervals, in order to provide a thorough understanding of the present invention. It will be appreciated by one having ordinary skill in the art that the present invention may be practiced without such specific details. In other instances, well known components, structures and techniques have not been described in detail in order to avoid obscuring the subject matter of the present invention. In addition, much of the functionality to be described further herein is described in terms of system flow with the aid of logic state diagrams to be implemented using programmable logic. Those of ordinary skill in the art will recognize that various components may be utilized for implementing the logic functions to be described herein. Once the functions to be carried out by the programmable logic have been described, those of ordinary skill in the art will be able to implement the present invention with various technologies without undue experimentation.

Figure 1:
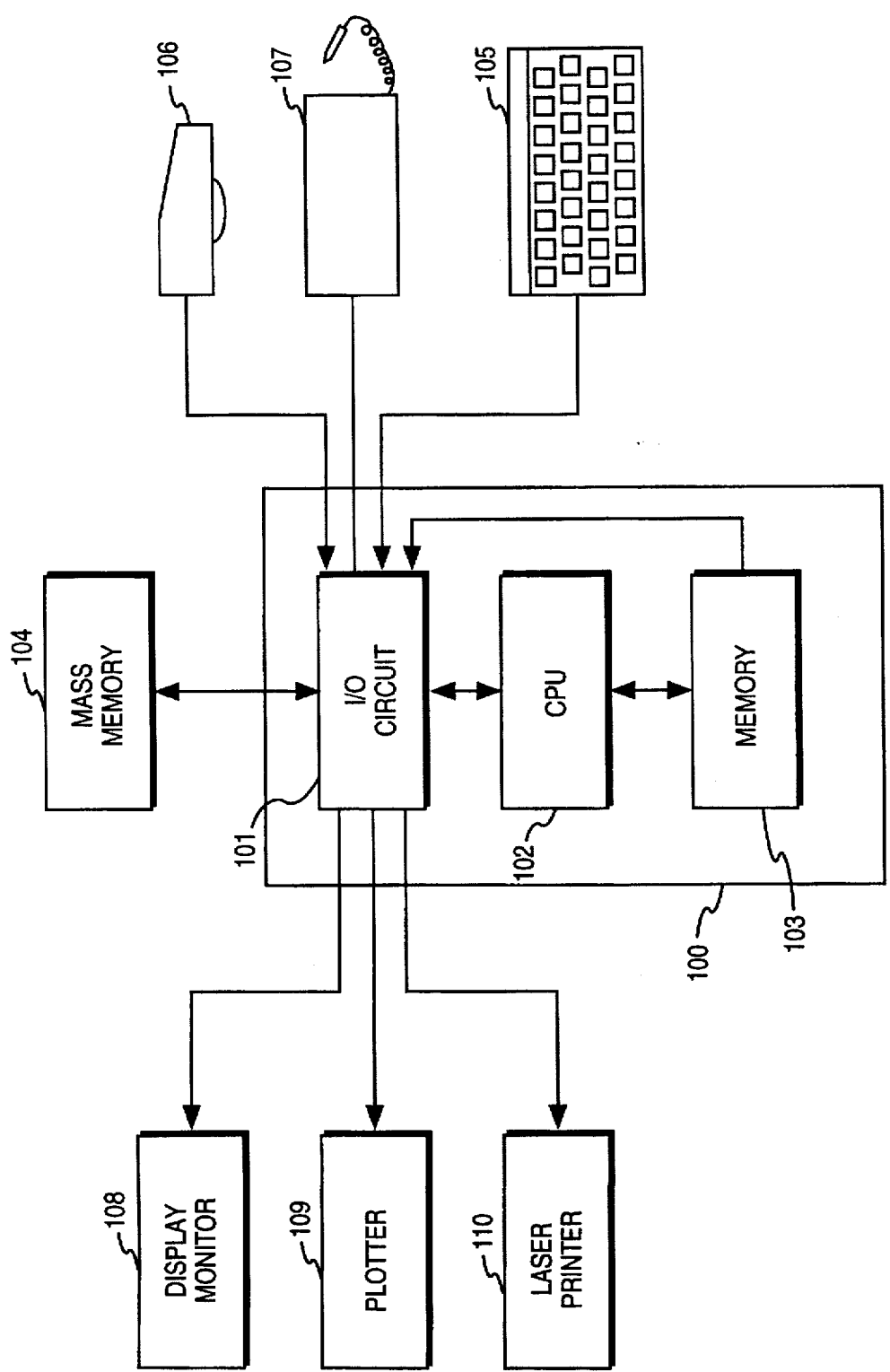
FIG. 1 illustrates a computer architecture which may incorporate the present invention.

Referring first to FIG. 1, a typical computer system which may utilize a microprocessor that implements the present invention is illustrated. As shown in FIG. 1, there is computer 100 which comprises three major components. The first of these is the input/output (I/O) circuit 101 which is used to communicate information in appropriately structured form to and from other parts of the computer 100 as well as out of the computer 100. Also shown as part of the computer 100 is the central processing unit (CPU) 102 and memory 103. These two latter elements are those typically found in most general purpose computers and almost all special purpose computers. In fact, the several elements contained within computer 100 are intended to be representative of this broad category of data processor.

Also shown in FIG. 1 is an input device 105, shown in a typical embodiment as a keyboard. There is also shown as an input device a graphics tablet 107. It should be understood, however, that the input device may actually be any other well-known input device. Such an input device may itself, of course, be another computer, and a computer (with I/O circuit, CPU and memory) may be embedded in the input device. A mass memory device 104 is coupled to I/O circuit 101 and provides additional storage capabilities for the computer 100. The mass memory may include other programs and may take the form of magnetic or optical disc drive or any other well-known device. It will be appreciated that the data retained within mass memory 104, may, in appropriate cases, be incorporated in standard fashion into computer 100 as part of memory 103.

In addition, three typical computer display devices are illustrated, the display monitor 108, the plotter 109 and a laser printer 110. Each can be used to display images or documents or other data utilized by the computer 100. It should be understood that the display device may actually be any other well-known output device. A computer (with I/O circuit, CPU and memory) may be embedded in the output device. A cursor control device 106, such as a mouse, trackball or stylus are also coupled to I/O circuit 101. Other pointing devices may suitably be used as appropriate.

The present invention is most suitable for use in microprocessors which maintain sets of local registers which are advantageously cached during a context switch. Such microprocessor organizations are very common in Reduced Instruction Set Computing (RISC) microprocessors. Of course, other microprocessor architectures may take advantage of the present invention. This is true whether those microprocessors occupy a single chip or more than one chip and regardless of the materials used to fabricate the chip including silicon or gallium arsenide.

Figure 2:
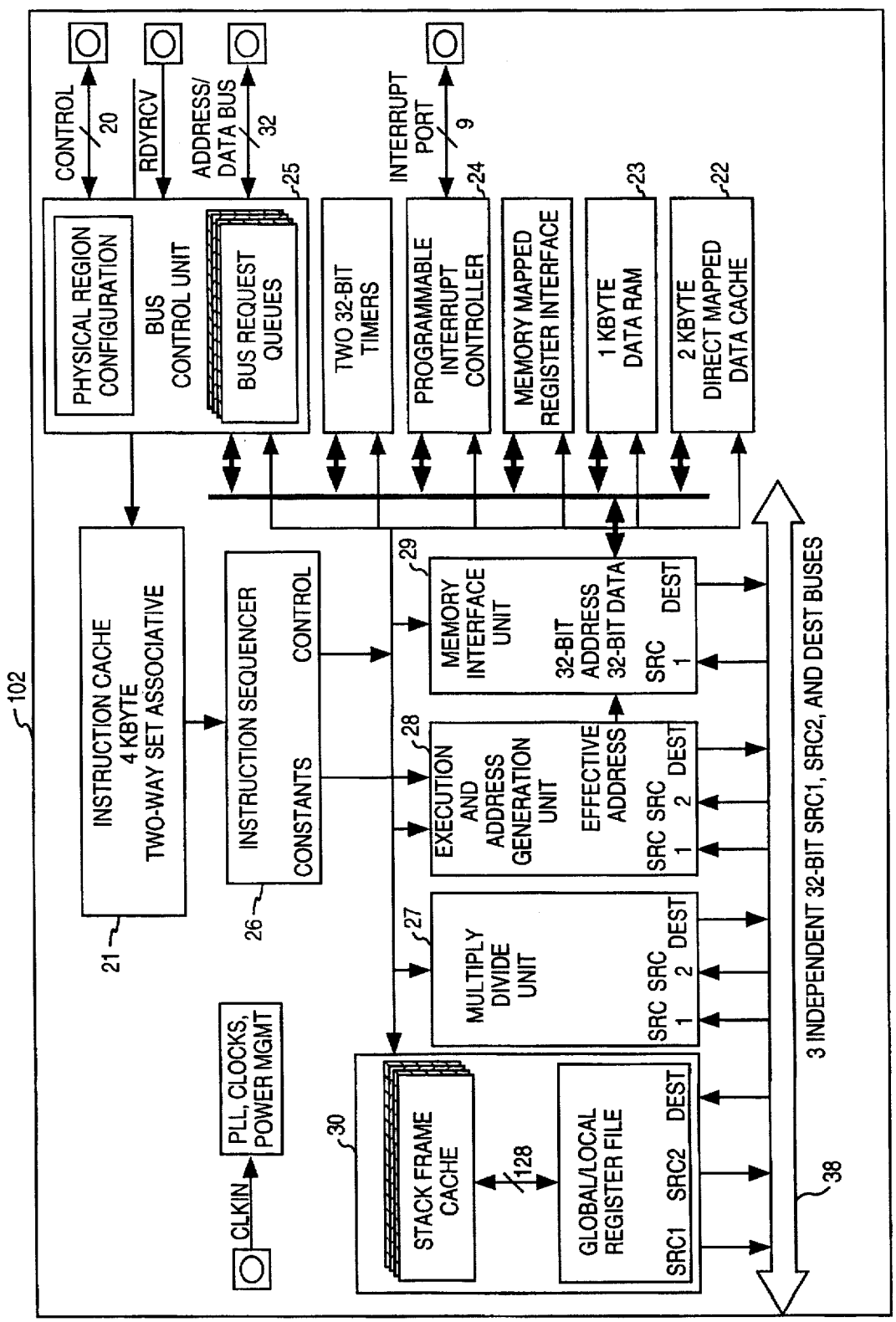
FIG. 2 is a block diagram illustrating one embodiment of a microprocessor which may be implemented in accordance with the teachings of the present invention.

Referring now to FIG. 2, a more detailed block diagram of the CPU 102 is illustrated. The microprocessor illustrated in FIG. 2 is only one embodiment of a microprocessor which may incorporate the present invention. The illustrative processor employs a 4-Kbyte, two-way set associative instruction cache 21, and a 2-Kbyte direct mapped data cache 22. There is also provided a 1-Kbyte data RAM 23 which is accessible to software for efficiency. For example, certain compilers may allocate the most frequently used variables into this RAM to reduce memory reference latencies. A programmable interrupt controller 24 provides a flexible, low latency means for requesting interrupts. It handles the posting of interrupts requested by hardware and software sources. In one embodiment, the interrupt controller 24 acts independently from the core of the processor, comparing the priorities of posted interrupts with the current process priority, off-loading this task from the core of the processor.

The microprocessor depicted in FIG. 2 communicates with external components such as the main memory 103 through a 32-bit multiplexed external bus. The bus control unit 25 is used to direct data transfer into and out of the processor. In one embodiment, the processor is equipped for coupling to a high bandwidth bus that provides burst transfer capability allowing up to 4 successive 32-bit data word transfers. Of course, other bus widths may be supported in alternative embodiments.

The microprocessor configuration illustrated in FIG. 2 utilizes three distinct functional units for carrying out instructions: multiply divide unit 27, execution/address generation unit 28 and memory interface unit 29 for processing memory requests based on addresses generated by execution/address generation unit 28. Instructions are propagated to the functional units through instruction sequencer 26. Instruction sequencer 26 receives instructions from the instruction cache 21 and decodes the instructions to be executed by one of the functional units. Typically, an instruction code will include an operation code (opcode) and provide information identifying the location of the source operands for the instruction (SRC1 and/or SRC2) as well as indicating a destination (DEST) address for the result of the operation by the execution units.

Within the processor illustrated in FIG. 2, all operations take place at the register level. Source operands specify either a global register, a local register or a constant value as instruction operands. The functional units are coupled to the register file 30 via three independent 32-bit buses. These are identified as source 1 (SRC1), source 2 (SRC2) and the destination (DEST) buses. In alternative embodiments of the present invention, a wider single bus, or smaller multiplexed common bus may be utilized (or various combinations of separate buses) for communicating between the register file 30 and the various functional units.

Figure 3:
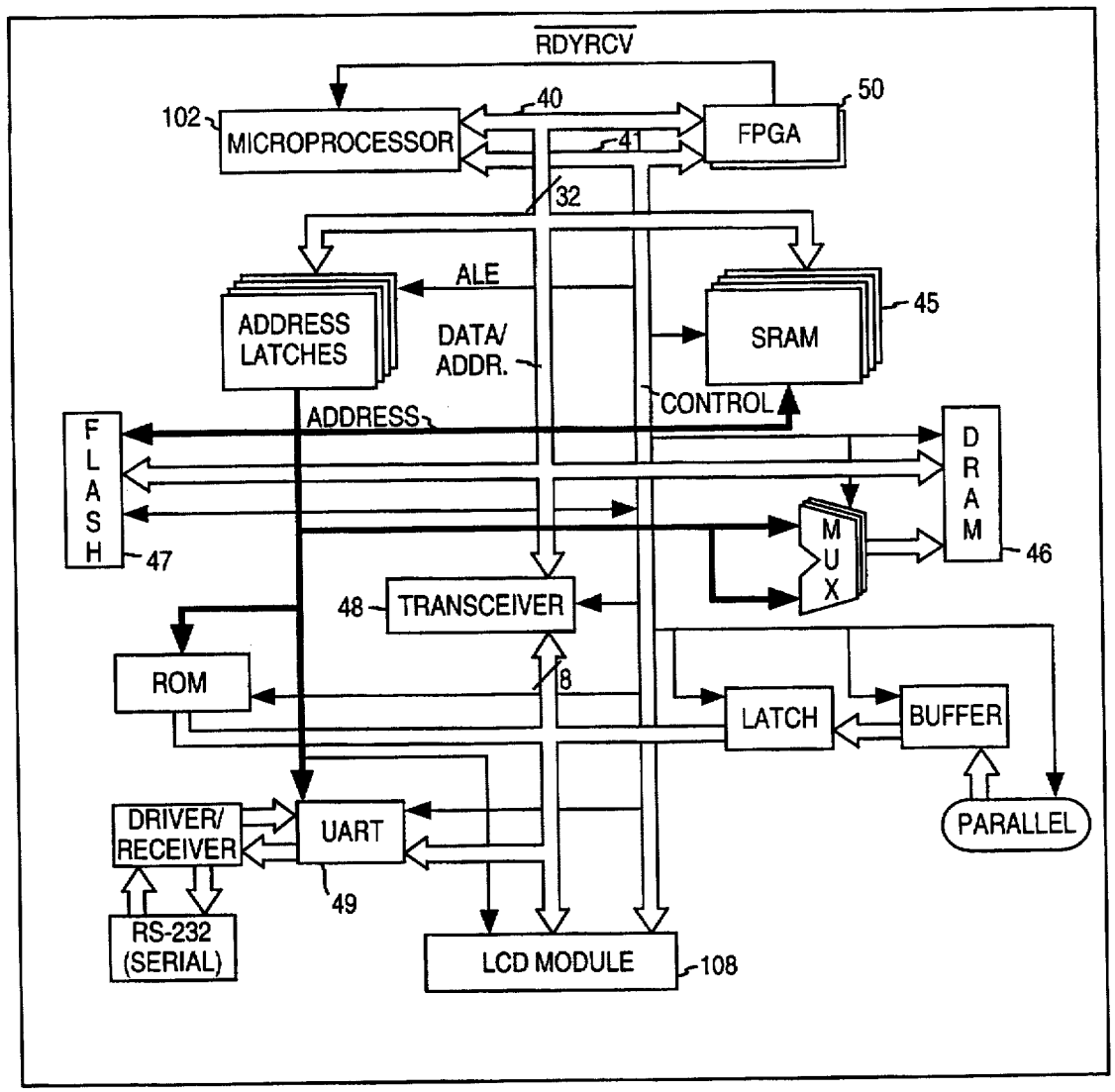
FIG. 3 illustrates a bus level architecture diagram of a computer system architecture incorporating the present invention wait state insertion mechanism.

Referring now to FIG. 3, an exemplary computer system architecture is illustrated emphasizing the bus organization of the computer system. The bus is identified as comprising multiplexed address/data lines 40 and control lines 41. The bus runs throughout the computer architecture linking the various components of the computer system so that they may communicate with the microprocessor 102. Alternative bus organizations may include separate address and data lines. Further, the bus protocol implemented for the described embodiment provides for burst data transfers at the rate of up to four 32-bit words per six system clock cycles.

In the exemplary computer system illustrated in FIG. 3, the components included that are coupled to the system bus are a static random access memory (SRAM) device 45, a dynamic random access memory (DRAM) device 46 and a flash memory 47. These memory devices vary in their speed, cost and intended purpose. In general, SRAM devices are much faster than DRAM, but are considerably more expensive and are used generally for the purpose of caching frequently used data. DRAM is less expensive than SRAM, but considerably slower. Its primary function is for the storage of executing routines and data for operating the running system. Flash memory 47 is a solid state storage medium for nonvolatile storage of data for extended periods of time. Flash memory is somewhat slower than DRAM but more suitable for mass storage. As an alternative to flash memory devices, many computer systems may implement magnetic hard disk drives or optical devices for mass storage.

In addition to the memory devices described above, the exemplary computer system of FIG. 3 further includes an LCD module 108 for use as a display device in communication with the microprocessor over the bus through transceiver 48. There is also included for the purposes of serial communication a standard universal asynchronous receiver/transmitter (UART) 49 for external communications.

Each of the components coupled to the system bus in the computer system illustrated by FIG. 3 satisfy bus transactions over the bus with differing response times. Previous microprocessors capable of inserting multiple defined wait state types required specific internal configuration for a given computer system implementation. In accordance with the present invention, a microprocessor's bus control unit is provided with logic circuitry responsive to a single external signal for controlling the state of the system bus. This is shown as the $\overline{RDYRCV}$ signal provided to the microprocessor 102 from the field programmable gate array (FPGA) logic 50. In one embodiment of the present invention, the programmable logic 50 may comprise two devices, a iFX740 and a iFX780, which are both products in the Intel FLEXlogic FPGA Family of programmable logic arrays. Programmable logic 50 may be used for implementing such things as the memory controllers for the system's DRAM and SRAM, but the scope of the present invention will be limited to describing the bus-related operation of generating the $\overline{RDYRCV}$ signal.

The operation of the present invention centers around configuring programmable logic 50 for each type of component communicating over the computer system bus. The programmable logic 50 will generate the appropriate pattern of $\overline{RDYRCV}$ signals to the microprocessor 102 to have the microprocessor provide sufficiently long bus cycles in accordance with the component with which the microprocessor is in communication. Throughout the following discussion, the $\overline{RDYRCV}$ signal will be a signal that is considered active in the low logic state and is thus denoted with the superscore over it in the figures and in the following discussion. In the descriptions which follow and the state diagrams illustrated in subsequent figures, a nomenclature is introduced for identifying particular bus states. Table I below identifies each state to be discussed further herein and its meaning as indicated in the following discussion:

TABLE I

| Bus State | Meaning |
|---|---|
| $T_a$: | Address State. Microprocessor drives address on bus. |
| $T_w$: | Wait State. Microprocessor waits for data device to return data (read) or receive data (write). $\overline{RDYRCV}$ deasserted. |
| $T_d$: | Data State. $\overline{RDYRCV}$(Ready/Recover) pin asserted, denoting data transfer. |
| $T_r$: | Recovery State. Additional recovery states injected if $\overline{RDYRCV}$ is asserted. |
| $T_i$: | Idle State. No bus activity. |

Figure 4:
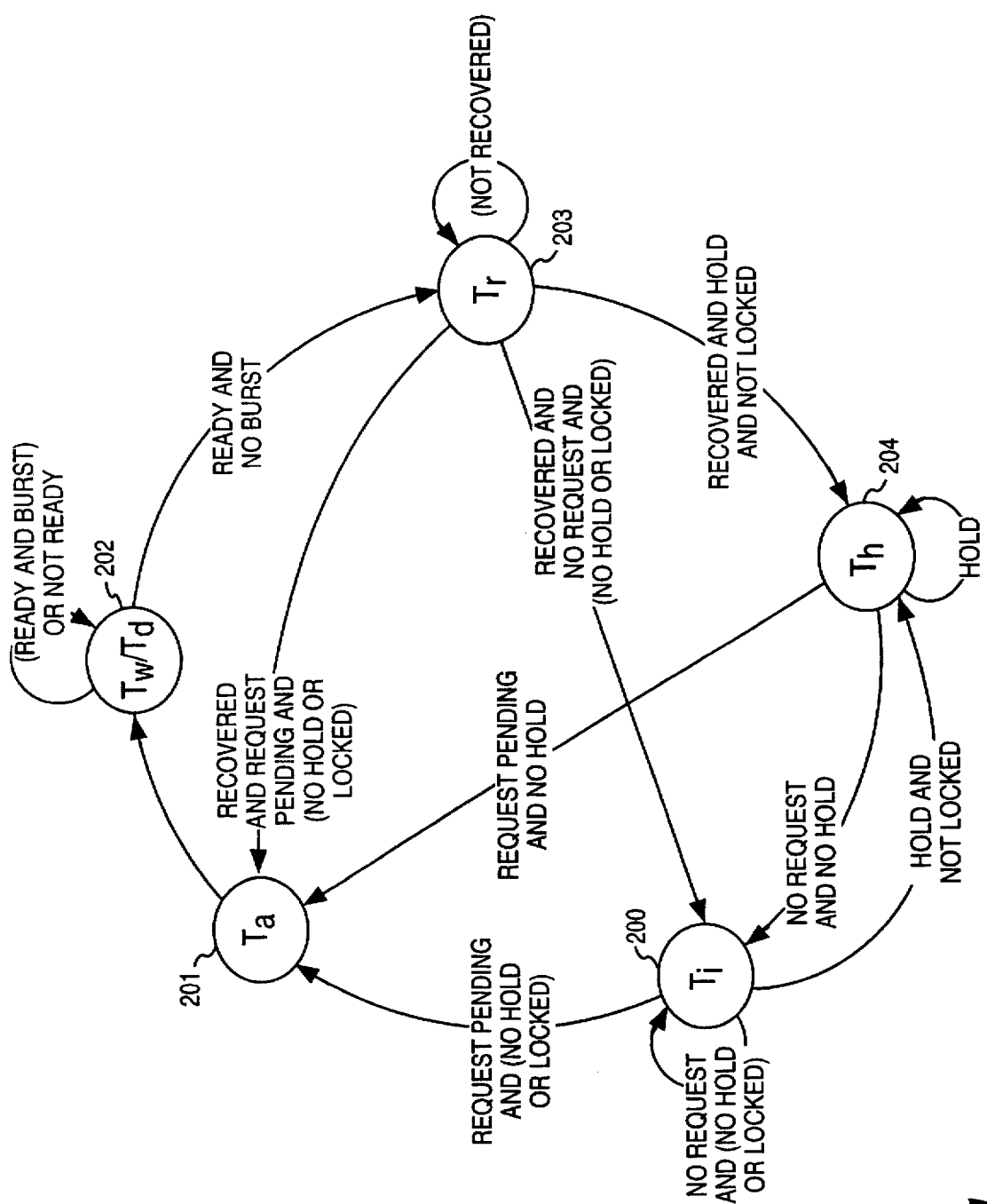
FIG. 4 illustrates a state diagram to be implemented by the bus control logic within a microprocessor for being responsive to the present invention wait state insertion mechanism.

FIG. 4 illustrates the state diagram logic followed by the system bus. The bus has six basic states as described above: idle ($T_i$), address ($T_a$), wait/data ($T_w/T_d$), recovery ($T_r$) and hold ($T_h$). During system operation, the processor continuously enters and exits different bus states according to the state diagram illustrated in FIG. 4.

The bus occupies the idle ($T_i$) state 200 when no address/data transfers are in progress. When the bus receives a new request, the processor enters the $T_a$ state 201 to transmit the address. Following a $T_a$ state 201, the bus enters the $T_w/T_d$ state 202 to transmit or receive data on the address/data lines 41. Assertion of the $\overline{RDYRCV}$ input signal indicates completion of each transfer. When data is not ready, the processor can wait as long as necessary for the memory or I/O device to respond. As mentioned above, the bus implemented in the exemplary computer system supports burst accesses. Accordingly, the processor asserts the signal $\overline{BLAST}$ (or Burst_Last) during the last $T_w/T_d$ states of an access.

After the last data transfer, the bus exits the $T_d$ state and enters the $T_r$ recovery state 203. In the case of a burst transaction, the bus exits the $T_d$ state and re-enters the $T_d/T_w$ state to transfer the next data word. Once all data words transfer in a burst transaction (up to four in one embodiment), the bus enters the $T_r$ state 203 to allow devices on the bus to recover. The processor remains in the $T_r$ state 203 until $\overline{RDYRCV}$ is deasserted. When the recovery state completes the bus returns to the $T_i$ state 200 if no new request is pending. If a request is pending, the bus enters the $T_a$ state 201 to transmit the new address. If a bus hold request is asserted, the bus transitions from the $T_r$ state 203 to the $T_h$ hold state 204 until the hold is lifted. Transitions between states for the microprocessor are driven by the system clock CLKIN. The external bus always runs at the frequency of CLKIN, up to 40 MHz in the illustrated embodiment.

Figure 5:
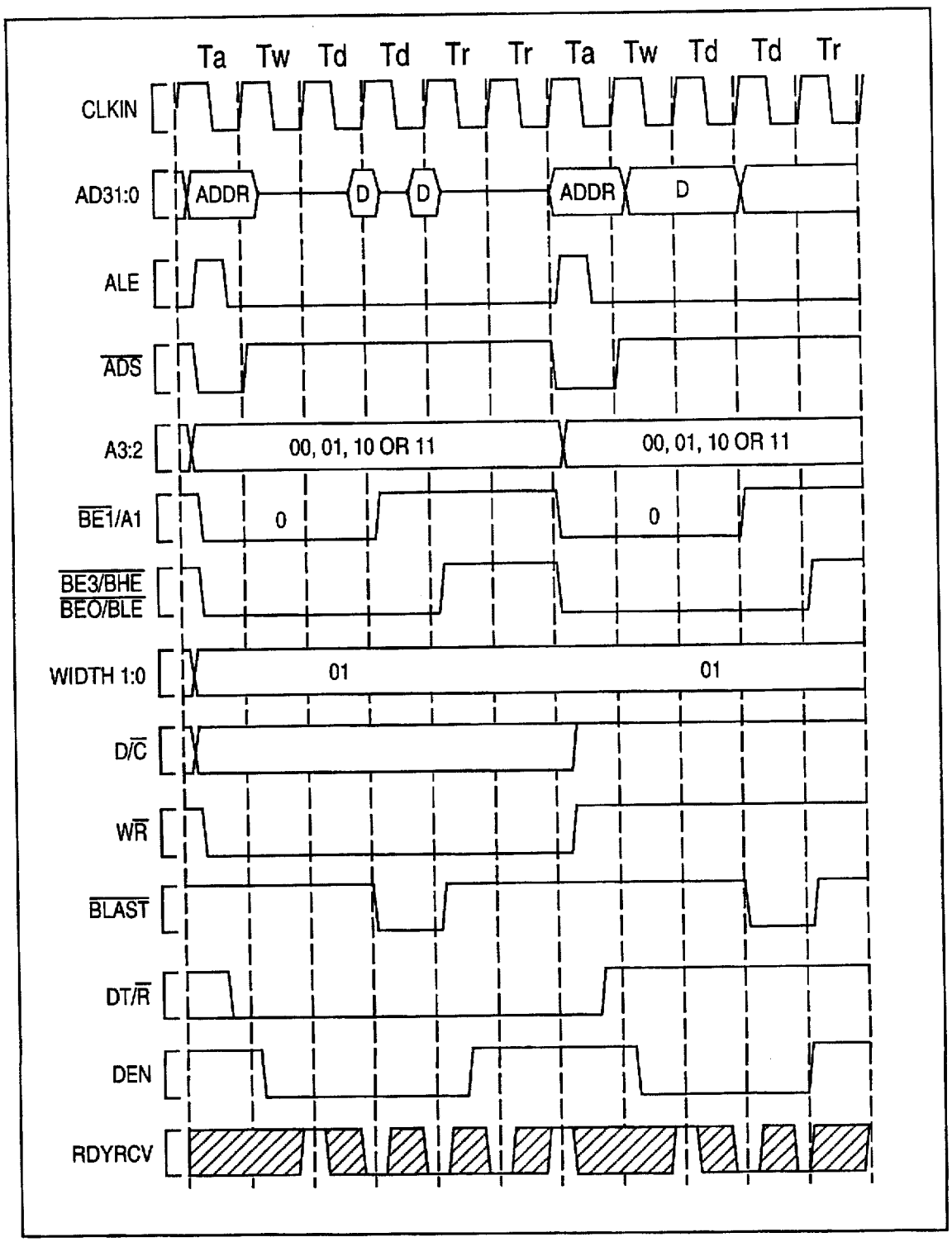
FIG. 5 illustrates a timing waveform for typical burst read/write transactions.

FIG. 5 illustrates a timing waveform for a typical back-to-back read and write access for the microprocessor 102. The first state is the address state ($T_a$). During the next state, the microprocessor samples the $\overline{RDYRCV}$ pin. Because the external programmable logic 50 drove the pin to logic high, that bus is in an address-to-data wait state ($T_w$). In the following state, $\overline{RDYRCV}$ is sampled as logic zero (the ready condition). The first data transfer ($T_d$) is considered complete at this time. In this example, a second $T_d$ state follows because the microprocessor 102 is capable of burst accesses. The second $T_d$ state would be preceded by a data-to-data wait state if the $\overline{RDYRCV}$ pin were sampled as logic high. The state following the last data state is a recovery ($T_r$) state. A minimum of one recovery state occurs. At the end of the first $T_r$ state, the $\overline{RDYRCV}$ pin is at the logic zero state, so the processor inserts an additional $T_r$ state. The transaction ends when $\overline{RDYRCV}$ is sampled at logic 1. In the illustrated timing example, the microprocessor 102 initiates a second bus transaction (starting with $T_a$). The second bus transaction is a write operation, and illustrates another address-to-data wait state controlled by the $\overline{RDYRCV}$ input.

The following discussion with respect to FIGS. 6(a)–6(g) describes example wait state profiles for the exemplary computer system of FIG. 3. The following discussion assumes typical microprocessor subsystems operating at up to 40 Megahertz (MHz). Of course, the principles to be discerned from the following examples may be generally applicable to other computer systems operating at different speeds with different components residing on the system bus. In the description pertaining to the following state diagrams, the idle state and address state are frequently identified as the same state for particular devices. In some cases, the recovery state is illustrated overlapping the address $T_a$ state. It should be understood that transitions from the $T_i/T_r/T_a$ state to a $T_w$ state are actually transitions from a $T_a$ state once an address has been decoded as indicating the particular component involved. Note also that each state corresponding to a $T_d$ or non-terminal $T_r$ state corresponds to a state in which the programmable logic 50 provides an active $\overline{RDYRCV}$ signal to the microprocessor 102.

Figure 6A:
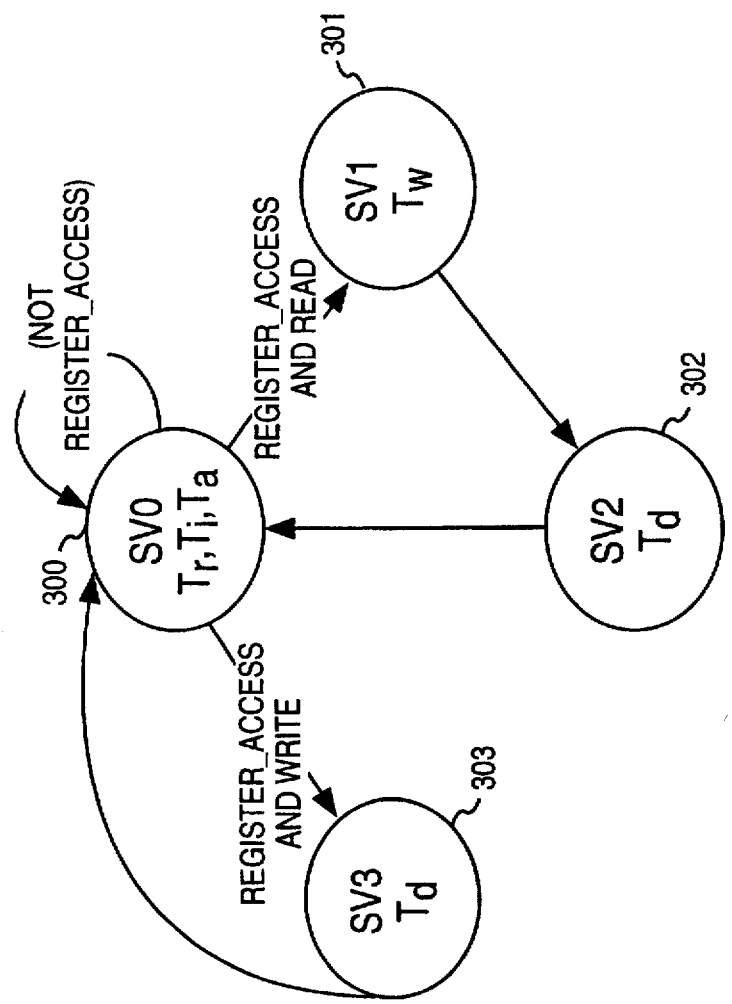
FIGS. 6(a)–6(g) illustrate logic state diagrams to be implemented by a logic device for providing a wait state insertion control signal to a microprocessor in accordance with one embodiment of the present invention.

FIG. 6(a) illustrates a bus state diagram for a bus access for the purpose of performing register I/O with a register in the field programmable gate array (FPGA) 50. The bus is initially in the idle ($T_i$) state 300 until a Register__Access condition is true. The Register__Access condition becomes true when the processor performs a read or write transaction to the FPGA control registers as determined by address decoding.

When the processor decodes an address which indicates a register read operation from the FPGA 50, the bus transitions from the $T_a$ state 300 to the wait ($T_w$) state 301. After one wait state, the bus transitions to the $T_d$ state 302 wherein the control register of the FPGA 50 provides the requested data over the data bus to the processor. During this state the FPGA provides an active $\overline{RDYRCV}$ signal to the microprocessor 102. When the data transfer is complete, the bus returns to state 300 which for one state is considered a recovery state, $T_r$, and then becomes either an idle state or address state depending on if a subsequent address to the FPGA control register is made. Note that one $T_r$ state is provided automatically without the assertion of $\overline{RDYRCV}$.

If a bus transaction is decoded as a register write transaction to the FPGA 50 control register space, then the bus transitions, according to the state diagram of FIG. 6(a), from address ($T_a$) state 300 to data ($T_d$) state 303. At this time, the data is written to the control register of the FPGA 50 while the FPGA provides an active $\overline{RDYRCV}$ signal to the microprocessor 102. When the data transfer is complete, the bus transitions to the recovery ($T_r$) state 300 and then into a subsequent idle or address state if the subsequent decode is to the FPGA 50.

Figure 6B:
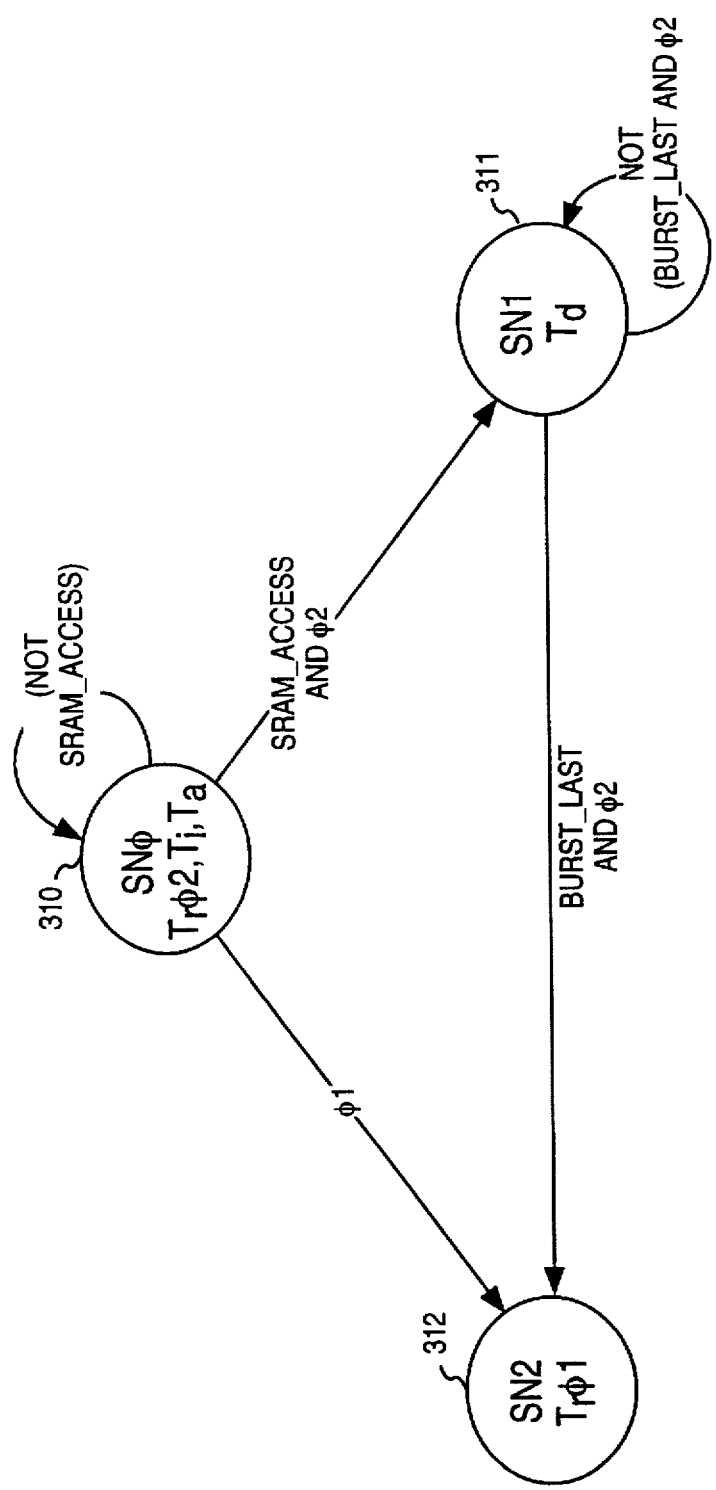

FIG. 6(b) illustrates a bus state transition diagram for bus transactions involving SRAM 45. In one embodiment of the present invention, the static RAM 45 provides for eight nanosecond access and is clocked to a 66 MHz clock, double the 33 MHz system clock. The bus is initially in the idle ($T_i$) state 310 and remains there until an SRAM__Access condition becomes true. The SRAM__Access condition goes true when the processor performs a data transaction to the static RAM and an SRAM address is decoded. The bus, upon an SRAM access, does not transition to the data ($T_d$) state 311 until phase 2 of the 33 MHz clock is achieved. The correspondence of phase 2 of the 33 MHz clock to a rising edge of the 66 MHz clock thus ensures that SRAM accesses are synchronized with the system bus.

The SRAM may be accessed in a burst mode. Accordingly, the state machine logic for the system bus remains in the data state 311 until the last transfer is complete. When there is a single transfer, or upon the last transfer of data to or from the SRAM, the signal Burst__Last will be asserted. Also, while in the data state 311, the FPGA 50 will assert the $\overline{RDYRCV}$ signal to the microprocessor 102. When the Burst__Last signal is active and the 80 MHz clock achieves phase 2, the bus transitions to state 312. State 312 is a recovery state ($T_r$) for one phase of the 80 MHz clock. A transition is then made back to recovery/idle state 310 for the second phase of the 80 MHz clock corresponding to the falling edge of the 40 MHz clock. The system bus then transitions to the idle state until a new transaction is initiated.

Figure 6C:
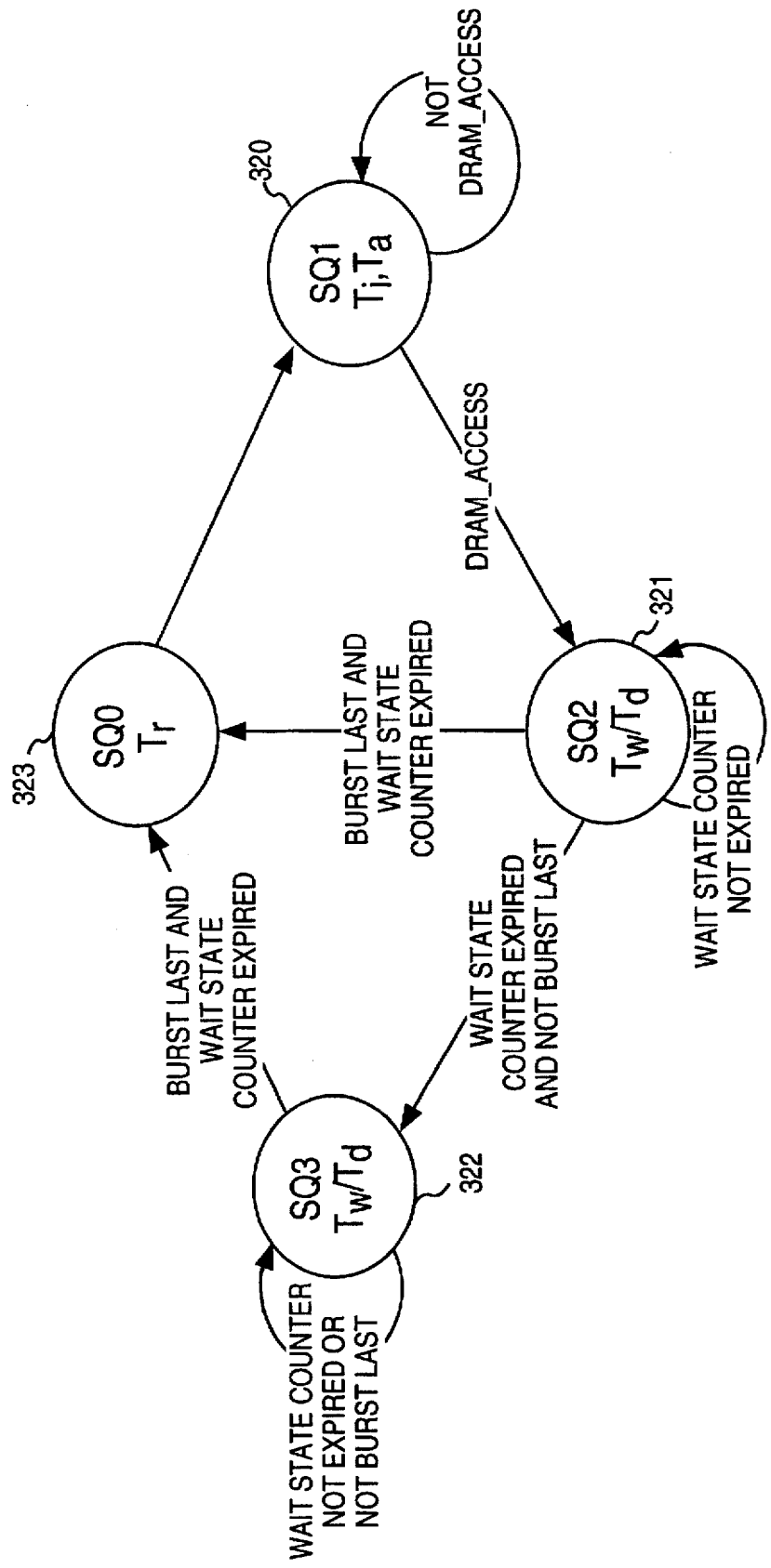

FIG. 6(c) illustrates the state machine logic diagram for dynamic RAM related bus accesses. DRAM transactions involve roughly 60 nanosecond access times and, in one embodiment, the DRAM 46 supports a page mode of operation. For the purposes of DRAM accesses, a synchronous wait state counter is implemented in the FPGA which is initialized from a control register. The wait state counter is monitored for each state transition to ensure a suitable amount of time for DRAM transactions. Essentially, the wait state counter is a three bit counter which is decremented to zero for each data transfer of a DRAM bus transaction.

The initial bus state for a DRAM access is the idle ($T_i$) state 320. The DRAM__Access condition goes true when the processor performs a data transaction to the DRAM and the DRAM address range is decoded. The bus transitions from the address ($T_a$) state 320 to the $T_w/T_d$ state 321. When the wait state counter expires the FPGA 50 will provide an active $\overline{RDYRCV}$ to the microprocessor 102. On the next clock, the bus will transition to the $T_w/T_d$ state 322 (and the counter will reload) if the DRAM transaction involved a burst access. If not, it will transition to the recovery state 323. If the bus achieves the $T_w/T_d$ state 322 it will remain in that state until the counter again expires and another $\overline{RDYRCV}$ pulse is delivered to the microprocessor. After the Burst__Last signal goes active and the wait state counter has expired, the bus will transition from the $T_d$ state 322 to the recovery state ($T_r$) 323. After one clock cycle in the $T_r$ state 323, the bus will transition back to the idle state 320.

Figure 6D:
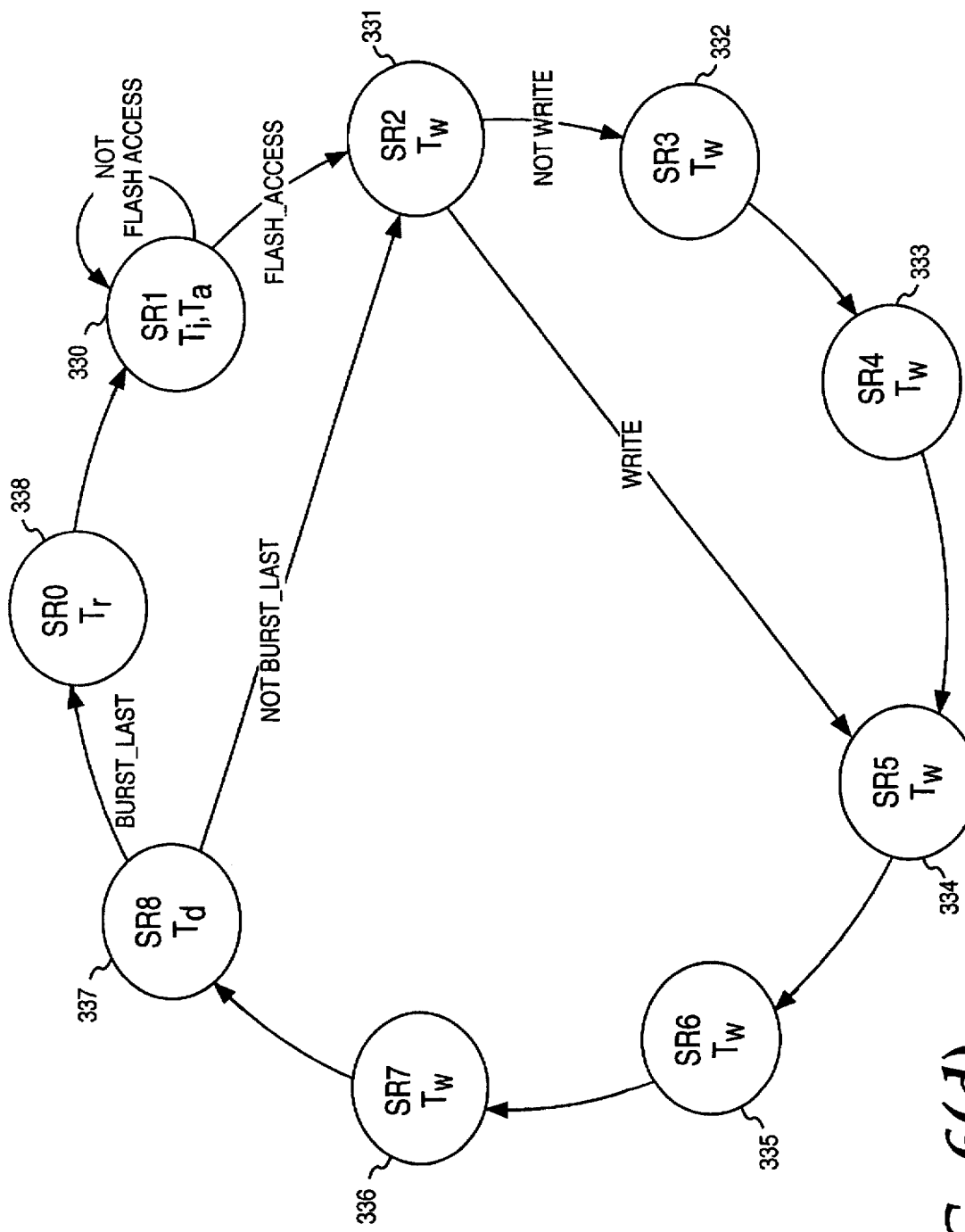

FIG. 6(d) illustrates the state machine logic diagram for providing an appropriate wait state profile for accesses to the exemplary computer system's flash memory device 48. In the described embodiment, the flash memory 48 provides for 120 nanosecond access times. Accordingly, for data reads, six wait states need to be inserted following the address decode prior to each data cycle. For write request to the flash memory, only four wait states need to be inserted prior to each data cycle. Accordingly, when the bus decodes an address indicating a flash access while in the $T_a$ state 330, it will perform a first state transition to $T_w$ wait state 331. If the flash access is not a write access, the bus will transition through wait states 332, 333 and 334. A write request to the flash memory will immediately transition the bus from wait state 331 to wait state 334. Following wait state 334, the bus will transition through wait states 335 and 336 until the bus achieves data ($T_d$) state 337. Note that while in the data state, the FPGA 50 provides an active $\overline{RDYRCV}$ signal to the microprocessor 102 for processing by the bus control logic of the microprocessor.

When a flash memory transaction is being processed, the first data transmission occurs at data state 337. If a burst access is involved and the data state 337 has not involved the last piece of burst data, the bus will return to wait state 331 to insert the proper number of wait states before the next transition to data state 337. After the last data transfer for a given cycle has been completed, the bus will transition from data state 337 to recovery state 338 for one clock cycle before returning to the idle $T_i/T_a$ state 330.

Figure 6E:
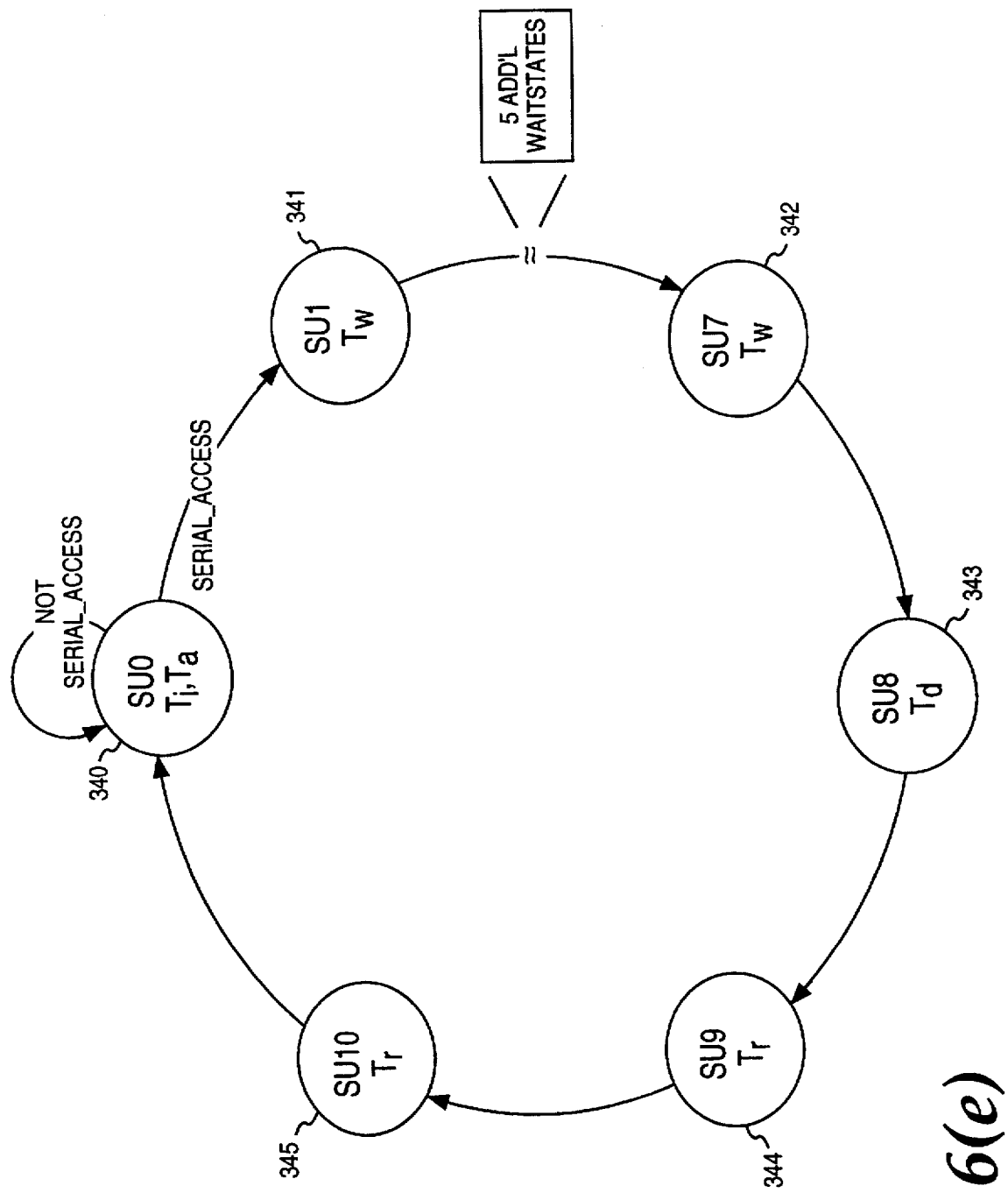

FIG. 6(e) illustrates the state machine logic for inserting an appropriate wait state profile for accesses to the exemplary computer system's standard universal asynchronous receiver/transmitter (UART) 49. For the UART 49, for both read and write accesses, seven wait states need to be inserted following the address state ($T_a$) prior to the data ($T_d$) state. Further, two recovery states must be provided before returning to the idle ($T_i$) state to provide the minimum read cycle time required by the UART. Thus, upon a decoding of a Serial_Access, the state machine transitions from the $T_a$ state 340 to the first wait state 341 and proceeds through to a sixth wait state 342 until finally transitioning to data state 343. During the data state, the FPGA 50 provides an active $\overline{RDYRCV}$ signal to the microprocessor 102. Following the data state 343, two recovery states 344 and 345 are provided before returning to the $T_i/T_a$ state 340. The $\overline{RDYRCV}$ signal is held active in the first $T_r$ state by the FPGA 50.

Figure 6F:
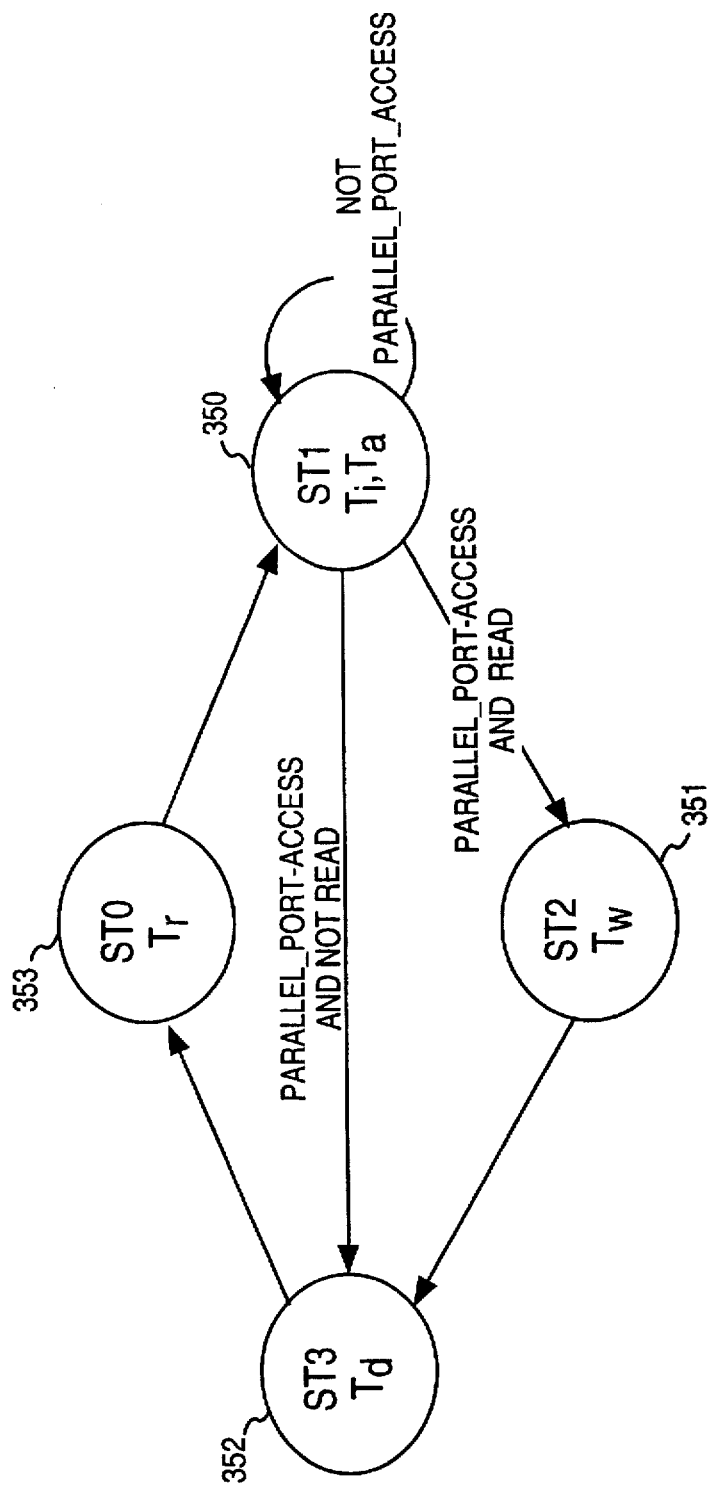

FIG. 6(f) demonstrates the state machine diagram logic for register I/O to the parallel port. The Parallel_Port_Access condition becomes true when the processor performs a data transaction to read data from the parallel port or to write parallel port control outputs. If a read request is being propagated to the parallel port over the bus, the bus state transitions from the $T_i/T_a$ state 350 to a wait ($T_w$) state 351. Following the wait state, the bus transitions to the data state 352. If the access to the parallel port is a not a read access, the wait state is omitted and the bus transitions directly from the $T_i/T_a$ state 350 to the data state 352. In the data state the $\overline{RDYRCV}$ signal is held active. Following the data state 352 (with $\overline{RDYRCV}$ active), the bus transitions for one clock cycle to the recovery ($T_r$) state 353 and then proceeds back to the $T_i/T_a$ state 350.

Figure 6G:
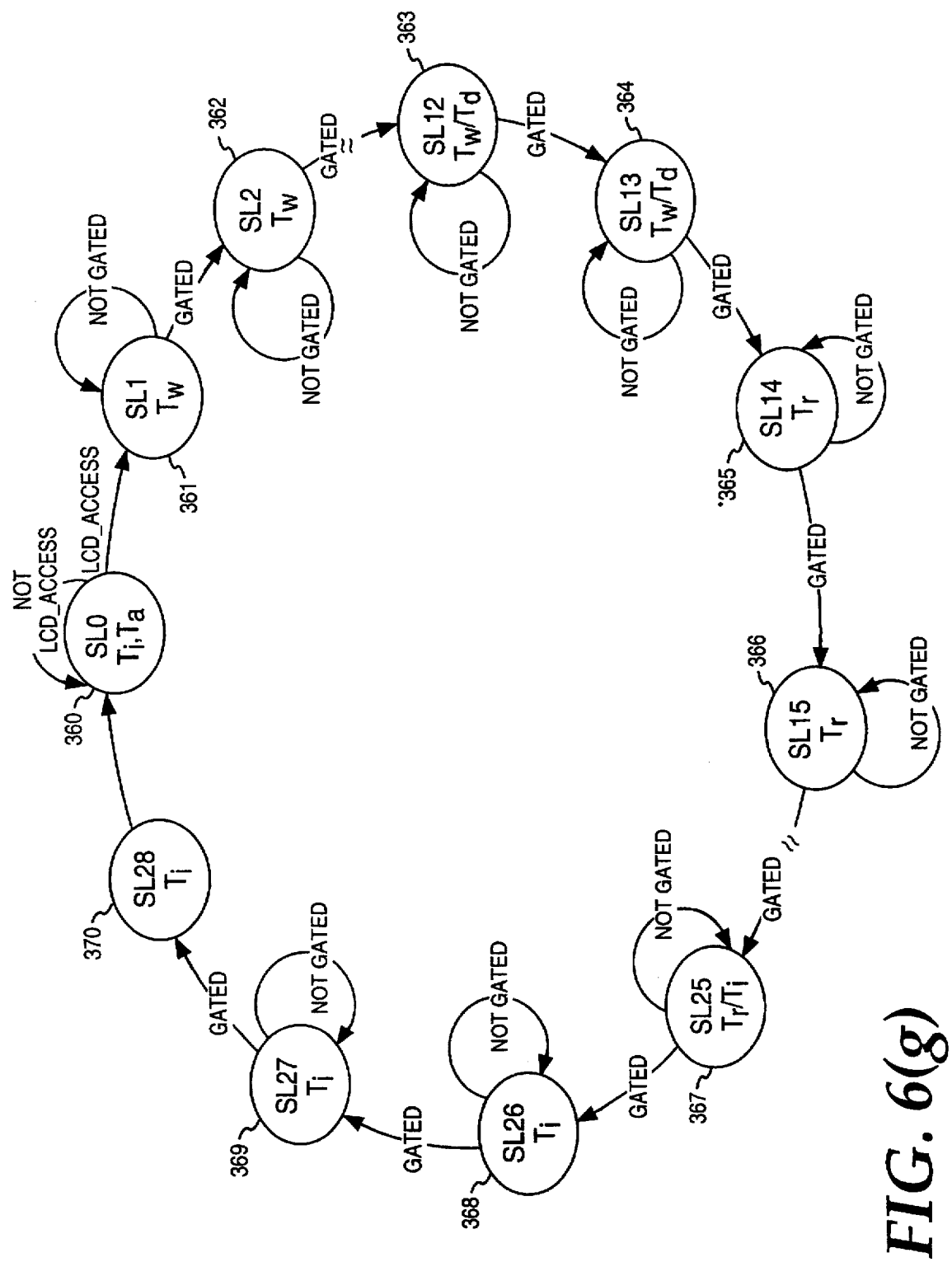

Referring finally to FIG. 6(g), the state machine logic diagram for a bus access to the LCD module 108 is illustrated. In the embodiment of the exemplary computer system of FIG. 3, the LCD module is considerably slower than the previous devices described above with respect to bus accesses. For read accesses, 21 or 22 wait states need to be inserted between the address state and the data state followed by 26 recovery states. Write accesses require 23 or 24 wait states prior to the data state followed by 24 recovery states. The exact number of inserted wait states depends on the phase relationship of the bus clock and a clock synchronous to the bus clock but running at half the frequency.

The transition for an LCD module access over the bus from the $T_i/T_a$ state 360 to the first wait state 361 is conditioned upon a determination of an LCD access by the microprocessor. As indicated in FIG. 6(g), the bus remains in the wait state until a "Gated" condition is satisfied. With respect to the LCD module, the 40 MHz system clock is qualified ("Gated") by the second phase of a 20 MHz clock, effectively reducing the count rate to 20 MHz for most state transitions. Therefore, each state indicated in FIG. 6(g), with the exception of idle states 360 and 370, are occupied for two counts of the 40 MHz clock or one count of the 20 MHz clock. Following the first wait state 361 a second wait state 362 is entered and then numerous others until the appropriate number of wait states are introduced prior to the wait/data states 363 and 364. Similarly, following recovery states 365 and 366, a break is shown in the state diagram for the insertion of the remaining number of recovery states required for the selected LCD module. The bus then transitions through recovery/idle states 367, 368, 369 and 360 until returning to the initial idle $T_i/T_a$ state 360.

The state diagrams described above with respect to FIG. 6(a)–6(g) for the components of the exemplary computer system of FIG. 3, may be summarized in Table II below:

TABLE II

| Wait State Profiles for Bus Accesses to Typical Microprocessor Subsystems Operating at 40 MHZ | |
|---|---|
| Register I/O to Field Programmable Gate Array | Read: $T_a$, $T_w$, $T_d$, $T_r$<br>Write: $T_a$, $T_d$, $T_r$ |
| Static RAM (8 ns.) | Read: $T_a$, $T_d$, $T_d$, $T_d$, $T_d$, $T_r$<br>Write: $T_a$, $T_d$, $T_d$, $T_d$, $T_d$, $T_r$ |
| Dynamic RAM (60 ns. Page Mode) | Read: $T_a$, $T_w$, $T_w$, $T_w$, $T_d$, $T_w$, $T_d$, $T_w$, $T_d$, $T_w$, $T_d$, $T_r$<br>Write: $T_a$, $T_w$, $T_w$, $T_w$, $T_d$, $T_w$, $T_d$, $T_w$, $T_d$, $T_w$, $T_d$, $T_r$ |
| Flash Memory (120 ns.) | Read: $T_a$, $6xT_w$, $T_d$, $6xT_w$, $T_d$, $6xT_w$, $T_d$, $6xT_w$, $T_d$, $T_r$<br>Write: $T_a$, $4xT_w$, $T_d$, $4xT_w$, $T_d$, $4xT_w$, $T_d$, $4xT_w$, $T_d$, $T_r$ |
| Standard UART (Universal Asynchronous Receiver/Transmitter) | Read: $T_a$, $7xT_w$, $T_d$, $T_r$, $T_r$<br>Write: $T_a$, $7xT_w$, $T_d$, $T_r$, $T_r$ |
| Register I/O to Parallel Port | Read: $T_a$, $T_w$, $T_d$, $T_r$<br>Write: $T_a$, $T_d$, $T_r$ |
| LCD Module | Read: $T_a$, 21 or $22xT_w$, $T_d$, $26xT_r$<br>Write: $T_a$, 23 or $24xT_w$, $T_d$, $24xT_r$ |

The determination of the active state of the $\overline{RDYRCV}$ signal may be defined by the following Boolean expression in which the '*' denotes the logical 'AND' operation and '+' denotes a logical 'OR' operation and '/' denotes the logical 'NOT' operation:

| Combined $\overline{RDYRCV}$Logic | |
|---|---|
| $\overline{RDYRCV}$:= SVmmm * REGISTER_ACCESS * WRITE | (1) |
| | Ready for FPGA register write |
| + SV1 | Ready for FPGA register read |
| + SNmmm*SRAM_ACCESS * PH2 | |
| | Ready for first SRAM read/write transfers |
| + SN1 * / (BURST_LAST * PH2) | |
| | Ready for subsequent SRAM read/write transfers |
| + SQ2 * LAST_WAIT | Ready for first DRAM read/write transfers. |
| + SQ3 * LAST_WAIT | Ready for subsequent DRAM read/write transfers. |
| + SR7 | Ready for Flash read/write. |
| + SU7 | Ready for UART read/write. |
| + SU8 | Insert extra $T_r$ for UART read/write |

-continued

| Combined RDYRCVLogic | |
|---|---|
| + ST1 * PARALLEL_PORT_ACCESS * WRITE | |
| | ; Ready for parallel port write. |
| + ST2 | ; Ready for parallel port read. |
| + SL11 * READ * GATED | ; Ready for LCD read. |
| + SL12 * READ | ; Insert extra $T_r$ states for LCD read. |
| + SL12 * WRITE * GATED; | Ready for LCD write. |
| + SL13 + SL14 + SL15 + SL16 + SL17 + SL18 + SL19 + SL20 + SL21 + SL22 + SL23 + (SL24 * NOT_GATED) | |
| | ; Insert extra $T_r$ states for ; LCD reads and writes |

As will be appreciated from the above description, the present invention provides a mechanism for inserting wait states by providing appropriate programming to the programmable logic 50 for generating a single control signal to the microprocessor 102. The present invention is not limited to the exemplary computer system of FIG. 3 and may be extended to any system in which it is desirable to have varying numbers of wait states for controlling access to a system's bus. Although the present invention has been described in terms of various embodiments, those of ordinary skill in the art will appreciate the various modifications and alterations might be made. Accordingly, the scope and spirit of the present invention should be determined in accordance with the claims which follow.

What is claimed is:

1. A computer system comprising:
   a bus for conveying data within said computer system;
   a microprocessor coupled to said bus, said microprocessor including bus control logic, wherein said bus control logic controls the state of the bus;
   a first component located externally to the microprocessor, capable of running at a different Speed than the microprocessor and coupled to said bus for communicating with said microprocessor, said first component requiring said bus to implement a first wait state profile for accesses to said first component; and
   wait state control logic coupled to said bus and to said microprocessor for providing a wait state control signal to said bus control logic for generating said first wait state profile responsive to a signal from the external component indicating an access to said first component.

2. The computer system of claim 1 wherein said wait state control logic comprises programmable logic wherein said programmable logic propagates said wait state control signal to said microprocessor in accordance with said first wait state profile.

3. The computer system of claim 2 wherein said programmable logic comprises a field programmable gate array (FPGA).

4. The computer system of claim 3 wherein said bus comprises multiplexed address and data lines.

5. The computer system of claim 4 wherein said first component located externally to the microprocessor comprises a control register within said FPGA.

6. The computer system of claim 5 wherein said bus control logic implements the following state diagram for establishing bus states:

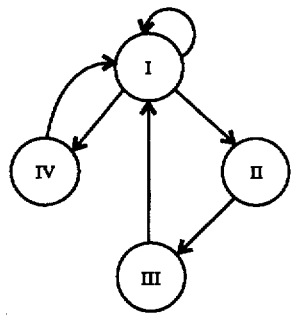

wherein state I corresponds to the idle, address and recovery states for said bus, state II corresponds to a wait state, states III and IV correspond to data states, for reading and writing said control register, respectively, wherein transitions from state I to state II correspond to a read access to said control register, and wherein transitions from state I to state IV correspond to a write access to said control register, said FPGA providing said wait state control signal in an active state to said microprocessor during said data and recovery states.

7. The computer system of claim 4 wherein said first component located externally to the microprocessor comprises a static random access memory (SRAM).

8. The computer system of claim 7 wherein said bus control logic implements the following state diagram for establishing bus states:

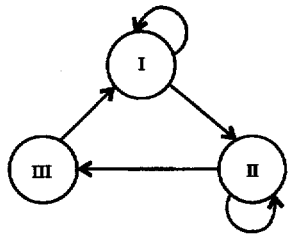

wherein state I corresponds to the idle, address and recovery states for said bus, state II corresponds to a data state, and state III corresponds to a recovery state, wherein transitions from state I to state II correspond to said microprocessor accessing said SRAM, and wherein transitions from state II to state III occur when a Burst_Last condition goes true, said FPGA providing said wait state control signal in an active state to said microprocessor during said data state.

9. The computer system of claim 4 wherein said first component comprises a dynamic random access memory (DRAM), said computer system further comprising a wait state counter which begins decrementing upon an access to said DRAM.

10. The computer system of claim 9 wherein said bus control logic implements the following state diagram for establishing bus states:

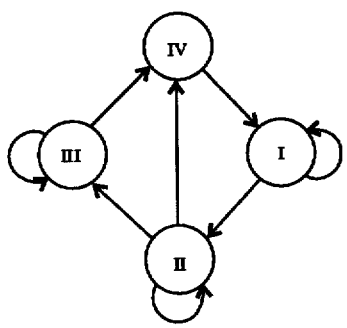

wherein state I corresponds to the idle and address states for said bus, states II and III correspond to wait and data states for reading and writing data to and from said DRAM, and state IV corresponds to a recovery state, wherein transitions from state I occur only upon a transaction over said bus to said DRAM, and wherein transitions from states II and III do not occur until said wait state counter has expired, and wherein transitions from state II to IV occur upon a Burst_Last condition being true and the wait state counter has expired, and wherein transitions from state II to III correspond to burst data requests not corresponding to the last data transfer, and further wherein transitions from state III to state IV correspond to the last data transfer in a burst transaction with said DRAM over said bus, said FPGA providing said wait state control signal in an active state to said microprocessor during said data and recovery states.

11. The computer system of claim 4 wherein said first component comprises a flash memory device.

12. The computer system of claim 11 wherein said bus control logic implements the following state diagram for establishing bus states:

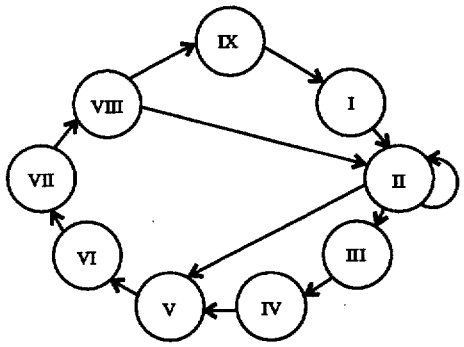

wherein state I corresponds to idle and address states, states II, III, IV, V, VI and VII correspond to wait states, state VIII corresponds to a data state for reading and writing data to and from said flash memory device, and state IX corresponds to a recovery state, wherein transitions from state I to state II occur only upon an access to said flash memory device, and wherein transitions from state II to state V correspond to a write request to said flash memory device, and transitions from state VIII to state II correspond to data transactions in a burst mode over said bus and not corresponding to a last piece of data, and wherein transitions from states VIII to IX correspond to a last piece of data being transferred to or from said flash memory device, said FPGA providing said wait state control signal in an active state to said microprocessor during said data state.

13. The computer system of claim 4 wherein said first component comprises a serial communications device.

14. The computer system of claim 13 wherein said serial communications device includes a universal asynchronous receiver/transmitter (UART).

15. The computer system of claim 14 wherein said bus control logic implements the following state diagram for establishing bus states:

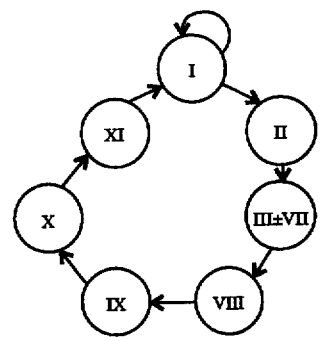

wherein state I corresponds to the idle and address states for said bus, states II through VIII correspond to wait states for said bus, state IX corresponds to the data state of said bus for data transactions with said UART, and both state X and XI correspond to a recovery state for said bus, wherein transitions from state I to state II occur upon a bus transaction with said UART, said FPGA providing said wait state control signal in an active state to said microprocessor during said data and extra recovery states.

16. An apparatus for lengthening a microprocessor's bus cycle to allow for data transfers with a first peripheral device located externally to the microprocessor and capable of operating at a different speed than the microprocessor over a bus comprising a wait state control signal generator coupled to said microprocessor for providing a wait state control signal to said microprocessor, responsive to a signal from the first peripheral device, in accordance with a wait state profile associated with said first peripheral device, said microprocessor being responsive to said wait state control signal and extending said bus cycle in accordance therewith.

17. The apparatus of claim 16 wherein said wait state control signal generator comprises programmable logic coupled to said bus for determining accesses to said first peripheral device and providing said wait state control signal to said microprocessor in accordance with a programmed wait state profile associated with said first peripheral device.

18. A method of extending a microprocessor's bus cycle to allow for data transfers over a bus with external peripheral devices comprising the steps of:

identifying an external peripheral device involved in a bus transaction with said microprocessor, the external peripheral device being located externally to the microprocessor and capable of operating at a different speed than the microprocessor;

providing a wait state control signal to said microprocessor, responsive to a signal from the external peripheral device, in accordance with a wait state profile associated with said external peripheral device; and said microprocessor in response to said wait state control signal inserting wait states into said bus cycle in accordance with said wait state profile.

19. The method of claim 18 wherein said providing a wait state control signal comprises the step of setting an active signal state from the external peripheral device to a microprocessor pin in communication with said microprocessor's bus control logic.

20. The method of claim 18 wherein said providing a wait state control signal comprises the step of executing state machine logic in a programmable logic device wherein said state machine logic corresponds to said wait state profile for said externally located peripheral device.

* * * * *